(12) United States Patent
Jeon et al.

(10) Patent No.: US 7,856,875 B2
(45) Date of Patent: Dec. 28, 2010

(54) WATER LEVEL SENSING UNIT, STEAM GENERATOR HAVING THE SAME, AND HEATING COOKING APPARATUS HAVING THE STEAM GENERATOR

(75) Inventors: Ki Suk Jeon, Seongnam-si (KR); Kobayashi Shozo, Suwon-si (KR); Seok Weon Hong, Yongin-si (KR); Jong Chull Shon, Suwon-si (KR); Hyang Ki Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 443 days.

(21) Appl. No.: 11/812,947

(22) Filed: Jun. 22, 2007

(65) Prior Publication Data

US 2008/0078243 A1 Apr. 3, 2008

(30) Foreign Application Priority Data

Sep. 28, 2006 (KR) ................... 10-2006-0094862

(51) Int. Cl.
G01F 23/00 (2006.01)

(52) U.S. Cl. .................... 73/290 R; 73/314
(58) Field of Classification Search ............... 73/290 R, 73/305, 309, 317
See application file for complete search history.

(56) References Cited

U.S. PATENT DOCUMENTS

| | | | | | |
|---|---|---|---|---|---|
| 3,216,255 | A | * | 11/1965 | McFarlane | 73/290 R |
| 3,415,268 | A | * | 12/1968 | Tweed | 137/209 |
| 4,773,265 | A | * | 9/1988 | Baillie et al. | 73/305 |
| 4,906,485 | A | * | 3/1990 | Kirchhoff | 426/506 |
| 5,085,078 | A | * | 2/1992 | Baux et al. | 73/313 |
| 5,294,917 | A | * | 3/1994 | Wilkins | 340/625 |
| 5,426,271 | A | * | 6/1995 | Clark et al. | 200/84 C |
| 5,649,476 | A | * | 7/1997 | Montagnino et al. | 99/415 |
| 5,865,108 | A | * | 2/1999 | Montagnino et al. | 99/476 |
| 6,170,328 | B1 | * | 1/2001 | Ross et al. | 73/305 |
| 6,236,324 | B1 | * | 5/2001 | Nash | 340/619 |
| 6,267,046 | B1 | * | 7/2001 | Wanat | 99/332 |
| 6,662,382 | B2 | * | 12/2003 | Rump et al. | 4/304 |
| 6,880,398 | B2 | * | 4/2005 | Okamoto | 73/317 |
| 7,091,454 | B2 | * | 8/2006 | Cho et al. | 219/401 |

(Continued)

FOREIGN PATENT DOCUMENTS

EP 1658798 A1 5/2006

(Continued)

OTHER PUBLICATIONS

Chinese Office Action for corresponding Chinese Patent Application No. 2007101271848 dated Oct. 17, 2008 (5 pgs).

*Primary Examiner*—Hezron Williams
*Assistant Examiner*—Rodney T Frank
(74) *Attorney, Agent, or Firm*—Staas & Halsey LLP

(57) ABSTRACT

The water level sensing unit includes a sensing member having a sensor, the sensing member being installed at a side of the steam container, and a pivoting member having an extension adapted to pivotally rotate about a side thereof having a fixed position on the basis of the level of water. The sensor is adapted to sense positional variation of the extension, to thereby sense variation of the level of water in the steam container.

13 Claims, 6 Drawing Sheets

U.S. PATENT DOCUMENTS

| | | | |
|---|---|---|---|
| 7,304,271 B2 * | 12/2007 | Cho et al. | 219/401 |
| 7,323,662 B2 * | 1/2008 | Cho et al. | 219/401 |
| 2006/0011071 A1 * | 1/2006 | Cho et al. | 99/417 |
| 2006/0207440 A1 * | 9/2006 | Matsuo et al. | 99/467 |
| 2006/0237428 A1 * | 10/2006 | Cho et al. | 219/401 |
| 2007/0028780 A1 * | 2/2007 | Popeil et al. | 99/407 |
| 2007/0028781 A1 * | 2/2007 | Popeil et al. | 99/407 |

FOREIGN PATENT DOCUMENTS

| | | | |
|---|---|---|---|
| JP | 2002-107205 | | 4/2002 |
| JP | 2006038315 A | * | 2/2006 |
| JP | 2008014516 A | * | 1/2008 |
| WO | WO01/84060 A1 | | 11/2001 |

* cited by examiner

WATER LEVEL SENSING UNIT, STEAM GENERATOR HAVING THE SAME, AND HEATING COOKING APPARATUS HAVING THE STEAM GENERATOR

CROSS-REFERENCE TO RELATED APPLICATION

This application claims the benefit of Korean Patent Application No. 10-2006-0094862, filed on Sep. 28, 2006 in the Korean Intellectual Property Office, the disclosure of which is incorporated herein by reference.

BACKGROUND OF THE INVENTION

1. Field of the Invention

The present invention relates to a water level sensing unit, a steam generator having the water level sensing unit, and a heating cooking apparatus having the steam generator, and, more particularly, to a water level sensing unit having an improved structure to reliably sense variations in the level of water even when a large amount of scale exists, a steam generator having the water level sensing unit, and a heating cooking apparatus having the steam generator.

2. Description of the Related Art

Examples of general heating cooking apparatuses used to cook food include a microwave oven using a high frequency, and a gas oven and an electric oven designed to directly apply heat to food using a heater. Of the above-mentioned heating cooking apparatuses, the microwave oven is greatly limited in the kind of food cooked therein and suffers from deterioration in the taste of the cooked food because of excessive drying of the food. Also, the gas oven and the electric oven have problems of excessively long cooking time and low cooking efficiency because they use air having a relatively low density as a heat transfer medium between the heater and food to be cooked.

Recently, as a solution to the above described problems of the conventional heating cooking apparatuses, a heating cooking apparatus (hereinafter, referred to as "steam oven") has been developed. The steam oven is designed to heat food using steam. When cooking food using the steam oven, it is possible to maintain an appropriate amount of moisture in food and consequently, maintain the original taste of food. Also, steam filling up a cooking compartment of the oven acts as an efficient heat transfer medium, resulting in a reduction in cooking time.

The steam oven generally includes a steam generator to generate and supply steam by heating water, and a water supply device to supply water into the steam generator. The steam generator includes a steam container to provide a steam generation space therein, and a steam heater to heat water supplied into the steam container. The water supply device includes a water vessel, and a water supply pump to transfer water stored in the water vessel into the steam container.

The water pump is adapted to stop operation thereof after supplying a predetermined amount of water into the steam container, and the steam heater is adapted to generate steam by heating the water supplied into the steam container when power is applied thereto. The generated steam is supplied into a cooking compartment of the oven through a steam supply tube that connects the steam container to the cooking compartment. The amount of water filled in the steam container is reduced as the steam is discharged. If all the water in the steam container is evaporated and thus, the supply of steam is stopped, efficient cooking of food is not possible any more and overheating of the steam heater may result in damage to the steam generator as well as unwanted accidents. Therefore, in the case of the steam oven, water should be continuously supplied to the steam container whenever the level of water in the steam container is lowered below a predetermined level.

For this, a water level sensing unit is installed in the steam container and adapted to sense the level of water in the steam container, such that the water supply pump is operated in response to a signal from the water level sensing unit, to achieve automatic supply of water. Accordingly, it is important to accurately sense variation of the level of water in the steam container during the generation of steam for stable and safe operation of the steam oven without the risk of accidents.

Conventionally, there has been generally used a water level sensing unit wherein a float, which is made of foamed polypropylene (PP) material, is installed around a center shaft that is installed orthogonal to the surface of water so that the float is movable up and down according to variation of the level of water. The float has a magnet, and the center shaft has a magnetic sensor to sense a magnetic force of the magnet. Thereby, the magnetic sensor senses positional variation of the magnet depending on the level of water, thus sensing variation of the level of water.

However, the above-described conventional water level sensing unit has a problem in that the float made of foamed polypropylene material eventually absorbs an excessive amount of water. The soaked float has difficulty performing efficient upward and downward movements thereof and may fail to accurately sense variation of the level of water.

Furthermore, the steam container suffers from scale caused therein as steam is generated. The scale acts to prevent efficient upward and downward movements of the float as scale sticks to the float or center shaft, thereby preventing the sensor from accurately sensing variation of the level of water.

SUMMARY OF THE INVENTION

Accordingly, it is an aspect of the present invention to solve the above and/or other problems. It is another aspect of the present invention to provide a water level sensing unit having an improved structure to accurately sense variation of the level of water even when a large amount of scale exits, a steam generator having the water level sensing unit, and a heating cooking apparatus having the steam generator.

Additional aspects and/or advantages of the invention will be set forth in part in the description which follows and, in part, will be apparent from the description, or may be learned by practice of the invention.

The foregoing and/or other aspects of the present invention are achieved by providing a water level sensing unit to sense a water level of a container filled with water comprising: a sensing member having a sensor to generate a sensing signal, the sensing member being installed at a side of the container; and a pivoting member adapted to pivotally rotate about a side thereof having a fixed position on the basis of the level of water, wherein the sensor is adapted to sense positional variation of the pivoting member, to thereby sense a variation of the level of water in the container.

The pivoting member may comprise a hinge portion hingedly coupled to the sensing member; an extension extended from one end of the hinge portion; and a float coupled to the other end of the hinge portion and adapted to float on the surface of water.

The extension of the pivoting member may have a magnet provided at an upper surface thereof, and the sensor of the sensing member is a magnetic sensor to sense a magnetic force of the magnet.

The sensing member may have a magnet coupled to a lower surface thereof, and the magnetic sensor may be adapted to sense a variation of the level of the water filled in the container on the basis of the magnetic force that varies as the magnet of the sensing member is attached to or detached from the magnet of the extension.

The magnet of the extension may be detached from the magnet of the sensing member when the float reaches the minimum level of water in the container, whereby the minimum level of water in the container is sensed.

The magnet of the extension may be attached to the magnet of the sensing member when the float reaches the maximum level of water in the container, whereby the maximum level of water in the container is sensed.

The hinge portion may have a pin hole and the sensing member may have at least one coupling hole corresponding to the pin hole, whereby the hinge portion is hingedly coupled to the sensing member as a hinge pin is inserted through the pin hole and the coupling hole.

The float may have an air chamber formed therein, the air chamber being filled with air.

The foregoing and/or other aspects of the present invention are also achieved by providing a steam generator comprising: a steam container having a steam chamber to generate steam, a water supply portion to supply water into the steam chamber, and a steam discharge portion to discharge steam generated in the steam chamber; a steam heater coupled to the steam chamber to heat the water in the steam chamber; and a water level sensing unit installed to the steam container, to sense a variation of a level of water in the steam container, wherein the water level sensing unit comprises: a sensing member having a sensor to generate a sensing signal, the sensing member being installed at a side of the steam container; and a pivoting member to pivotally rotate about a side thereof having a fixed position on the basis of the level of water, and wherein the sensor senses positional variation of the pivoting member, to thereby sense the variation of the level of water in the steam container.

The steam container may comprise a mounting recess formed at a side position thereof, and the sensing member comprises a cover configured to be inserted into the mounting recess to seal the mounting recess.

The interior of the steam container may be divided, by use of a partition, into the steam chamber and the water level sensing chamber receiving the water level sensing unit installed therein, and a water flow path is defined between the steam chamber and the water level sensing chamber.

A drain hole may be provided below the water level sensing chamber, and a drain guiding member may be coupled underneath the drain hole, the drain guiding member having a drain pipe to discharge water in the water level sensing chamber.

The water supply portion may be connected to the water level sensing chamber, and the water level sensing chamber has a shield rib installed therein at a position in front of the water supply portion, to prevent water supplied through the water supply portion from being injected rapidly toward the water level sensing unit.

The foregoing and/or other aspects of the present invention are achieved by providing a heating cooking apparatus comprising: a body having a cooking compartment in which food is disposed; a steam container having a steam chamber to generate steam, a water supply device, a water supply portion connected to the water supply device to supply water into the steam chamber, and a steam discharge portion to discharge steam generated in the steam chamber into the cooking compartment; a steam heater coupled to the steam chamber to heat the water in the steam chamber; a water level sensing unit installed to the steam container, so as to sense a level of water in the steam container; and a controller to control the water supply device in response to a sensing signal from the water level sensing unit, wherein the water level sensing unit comprises: a sensing member having a sensor to generate the sensing signal, the sensing member being installed at a side of the steam container; and a pivoting member adapted to pivotally rotate about a side thereof having a fixed position on the basis of the level of water, and wherein the sensor is adapted to sense a positional variation of the pivoting member, to thereby sense a variation of the level of water in the steam container.

The controller may be adapted to supply water into the steam container by operating the water supply device for a predetermined time if the water level sensing unit senses the minimum level of water in the steam container.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENT

Figure 1:
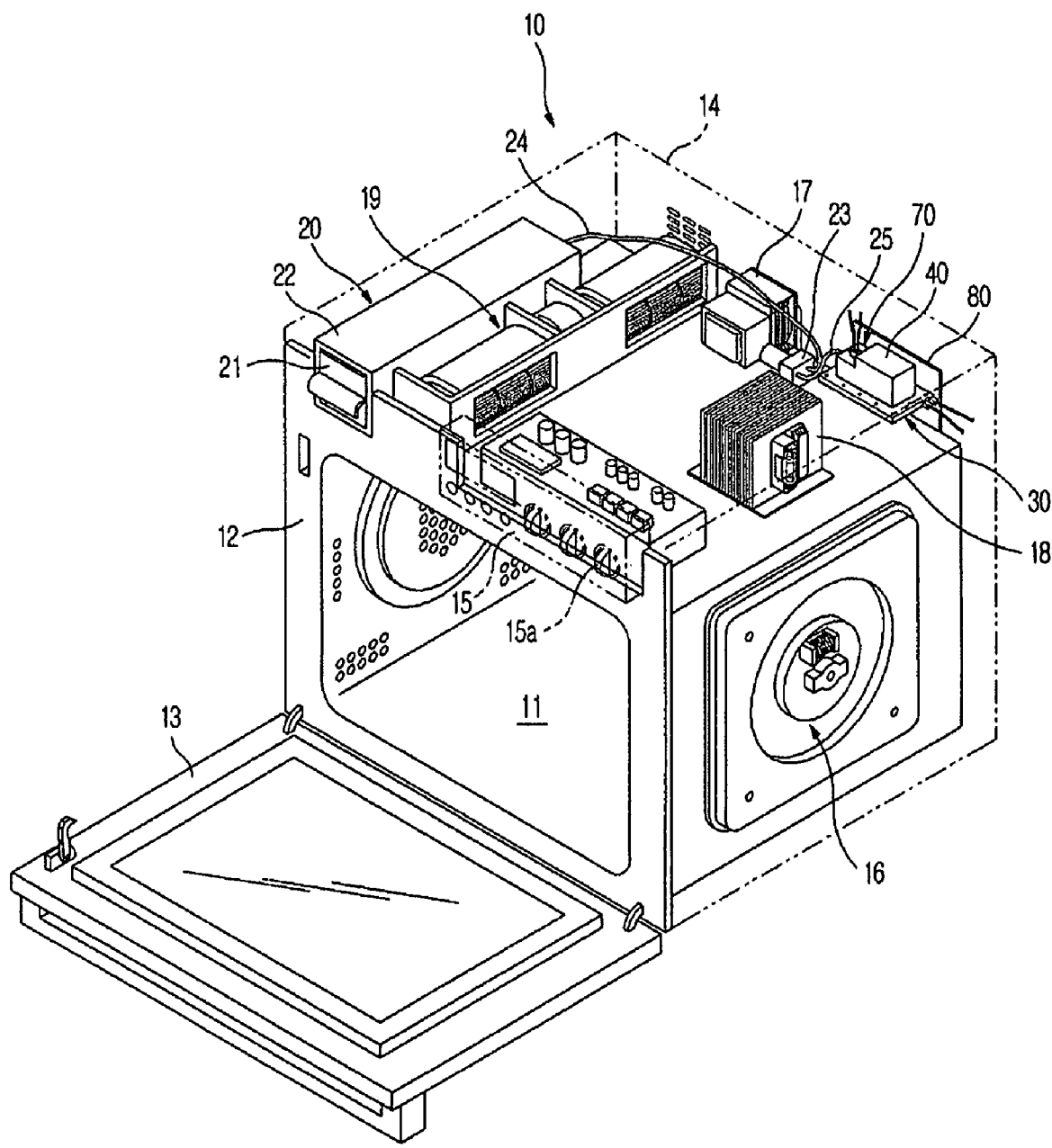
FIG. 1 is a perspective view schematically showing a heating cooking apparatus according to an embodiment of the present invention.

Reference will now be made in detail to the embodiment of the present invention, an example of which is illustrated in the accompanying drawings, wherein like reference numerals refer to the like elements throughout. The embodiment is described below to explain the present invention by referring to the figures.

Figure 2:
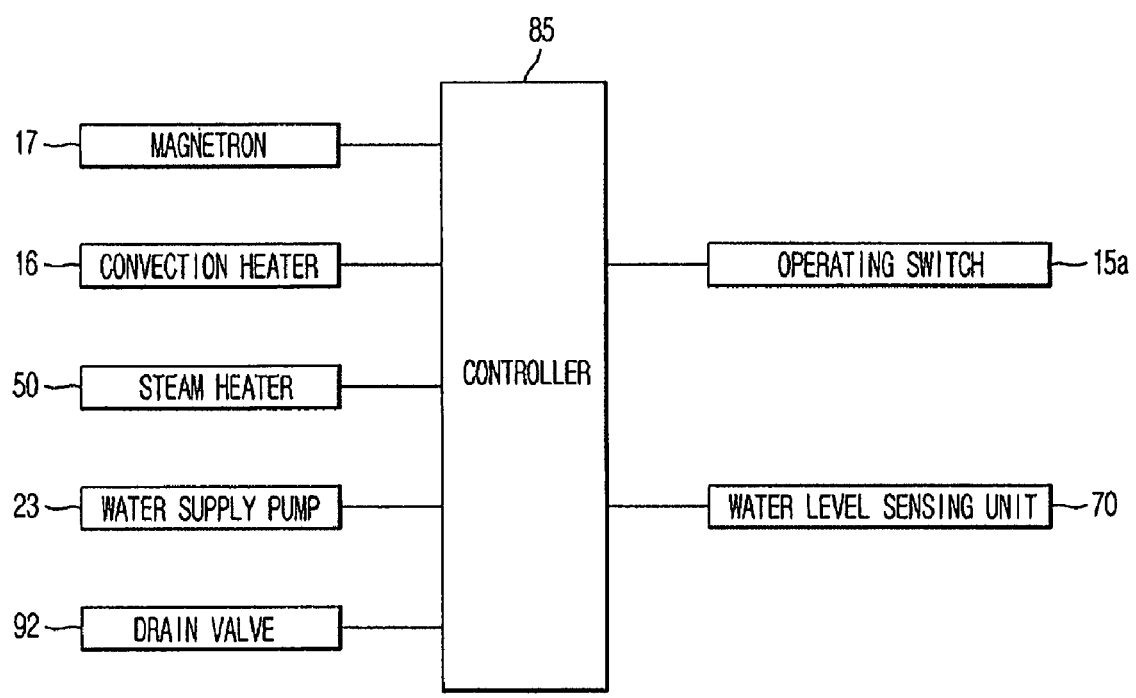
FIG. 2 is a block diagram schematically showing the heating cooking apparatus according to the embodiment of the present invention.
Figure 3:
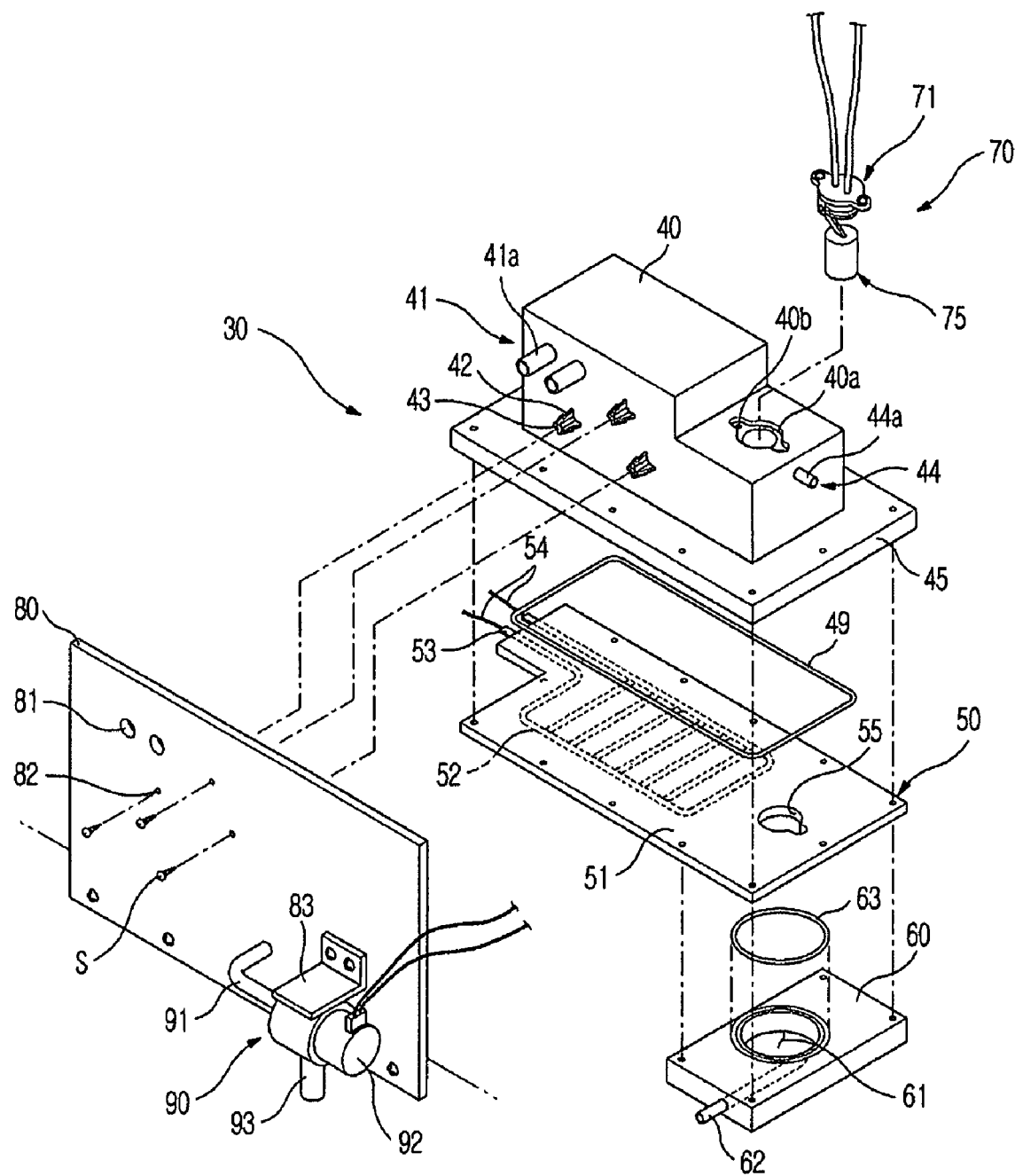
FIG. 3 is an exploded perspective view schematically showing a steam generator according to the embodiment of the present invention.
Figure 4:
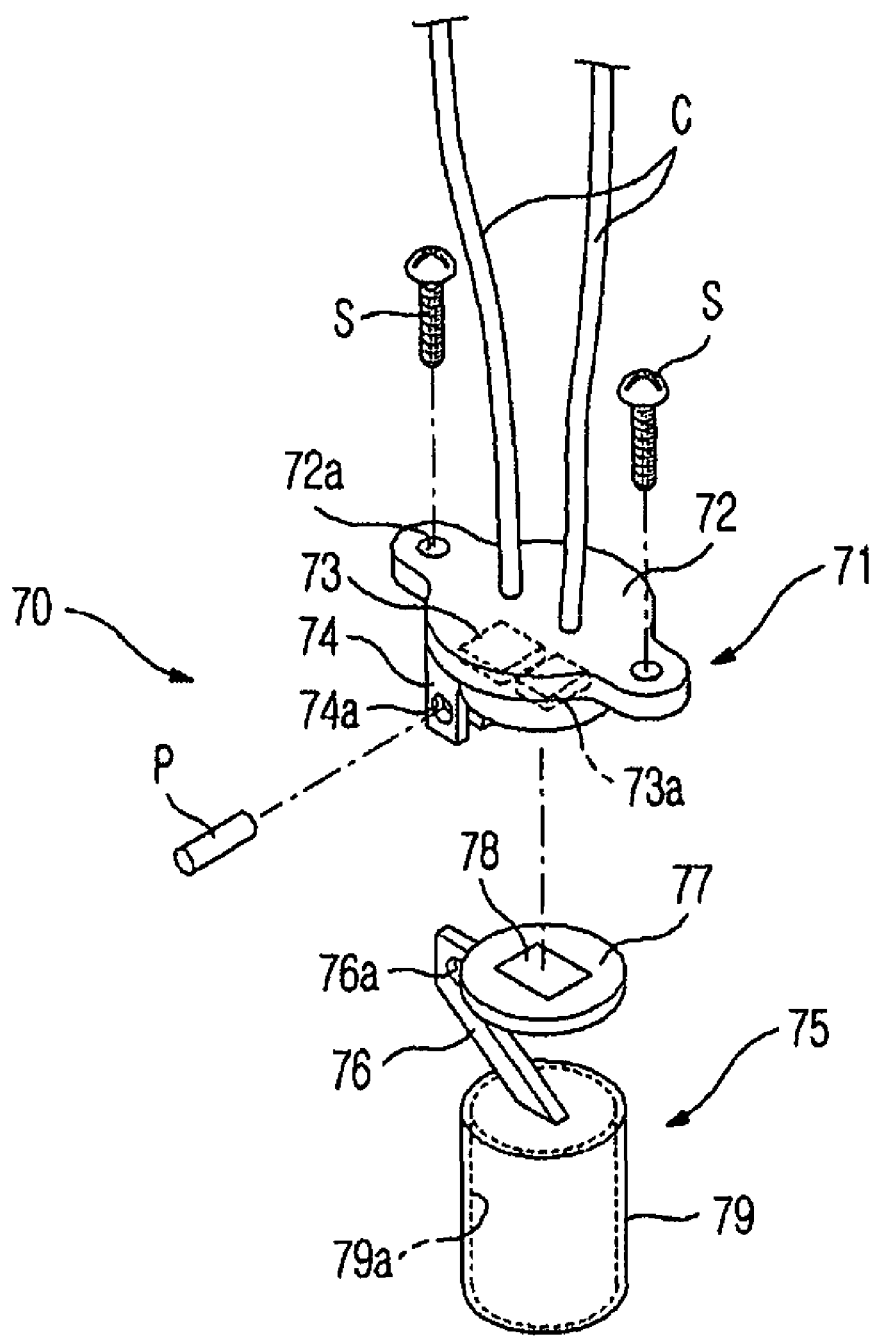
FIG. 4 is an exploded perspective view schematically showing a water level sensing unit according to the embodiment of the present invention.
Figure 5:
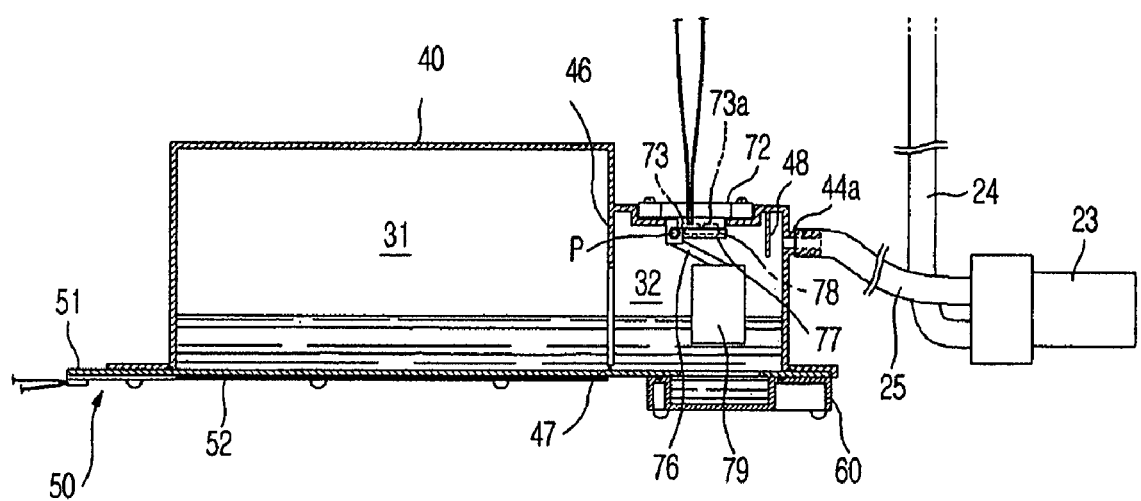
FIGS. 5 and 6 are side sectional views showing the operation of the steam generator according to the embodiment of the present invention.
Figure 6:
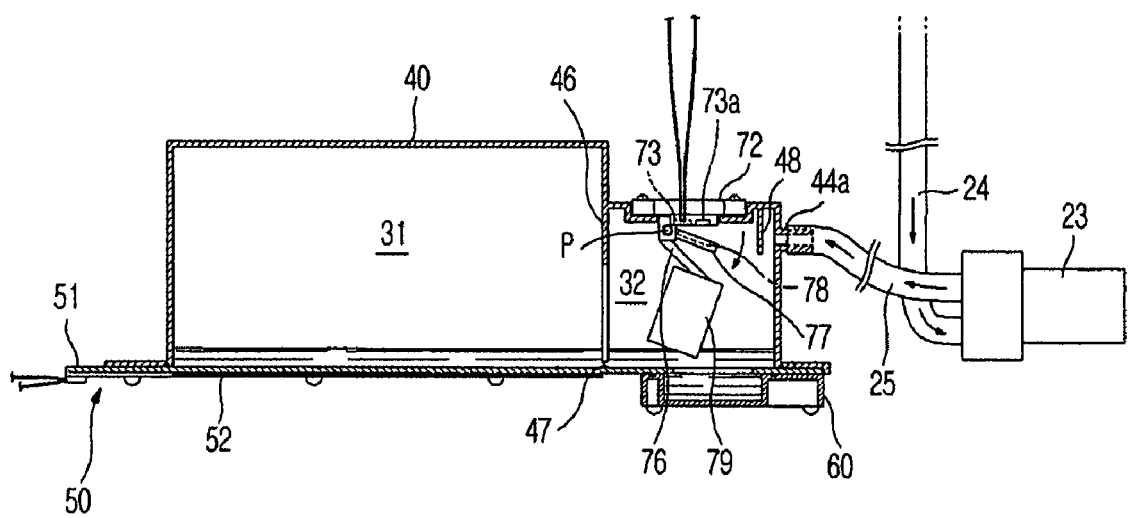

FIG. 1 is a perspective view schematically showing a heating cooking apparatus according to an embodiment of the present invention. FIG. 2 is a block diagram schematically showing the heating cooking apparatus according to the embodiment of the present invention. FIG. 3 is an exploded perspective view schematically showing a steam generator according to the embodiment of the present invention. FIG. 4 is an exploded perspective view schematically showing a water level sensing unit according to the embodiment of the present invention. FIGS. 5 and 6 are side sectional views showing the operation of the steam generator according to the embodiment of the present invention.

As shown in FIGS. 1 and 2, a heating cooking apparatus 10 includes a body 12 internally having a cooking compartment 11, a cover 14 configured to cover an upper side, both lateral sides, and a rear side of the body 12, a convection heater 16 provided at either lateral side of the body 12 to heat the cooking compartment 11, a magnetron 17 to generate microwaves and supply the generated microwaves into the cooking compartment 11, a steam generator 30 to generate steam and supply the generated steam into the cooking compartment 11, and a controller 85 to control overall operation of the apparatus.

The body 12 has an open front side for the entrance and exit of food. On the front side of the body 12 is provided a door 13 to open and close the cooking compartment 11 in which food is disposed. Between the upper side of the body 12 and the cover 14 covering the body 12 is defined an electric equipment chamber for the installation of various constituent elements of the cooking apparatus. A control panel 15 is provided on the body 12 at a front position of the body 12 and has a variety of operating switches 15a required for the manual operation by a user. A water supply device 20 to supply water into the steam generator 30 is also provided on the body 12 so that a water vessel 21 thereof is located at a side of the control panel 15.

The water supply device 20 includes the water vessel 21 to store water therein, and a water supply pump 23 to move the water stored in the water vessel 21 into the steam generator 30. The water vessel 21 is inserted in a water vessel case 22 that is mounted on the body 12 so that the water vessel 21 is slidably extracted or inserted from or into the water vessel case 22 in a drawer-type manner. The water supply pump 23 is connected to the water vessel 21 through a water supply tube 24 and also connected to the steam generator 30 through a water supply connection tube 25. A blower 19 is mounted on the body 12 at a side of the water supply device 20. The blower 19 is used to blow air, so as to cool several constituent elements disposed on the body 12.

The convection heater 16 and the magnetron 17 to cook food disposed in the cooking compartment 11 by supplying heat or microwaves into the cooking compartment 11. The convection heater 16 includes a heater (not shown) and a circulation fan (not shown) and circulates air heated by the heater into the cooking compartment 11. The magnetron 17 is adapted to generate microwaves upon receiving a high voltage from a high-voltage transformer 18 and to supply the generated microwaves into the cooking compartment 11 through a waveguide (not shown) that is coupled to a rear side of the cooking compartment 11.

The steam generator 30 is coupled to a supporting bracket 80 that is provided at an upper portion of the rear side of the body 12. The steam generator 30 is connected to the water supply device 20 and a drain device 90 to allow movement of water therebetween. As shown in FIG. 3, the steam generator 30 includes a steam container 40, a steam heater 50 coupled to a lower end of the steam container 40, a drain guiding member 60 coupled to a lower side of the steam heater 50 at a position close to a lateral side of the steam heater 50, and a water level sensing unit 70 coupled to a side of the steam generator 30.

The steam container 40 is formed, at one side surface thereof, with a steam discharge portion 41 to discharge steam generated in the steam container 40 and a plurality of coupling members 42 each having a screw hole 43 and, at another side surface thereof, with a water supply portion 44 to supply water into the water level sensing chamber 32. The steam discharge portion 41 includes at least one steam discharge pipe 41a protruded outward from the steam container 40. The steam discharge portion 41 is connected to at least one steam supply tube (not shown), to provide the cooking compartment 11 with steam generated in a steam chamber 31 that is defined in the steam container 40. The water supply portion 44 includes a water supply pipe 44a protruded outward from the steam container 40. The water supply portion 44 is connected to the water supply pump 23 through the water supply connection tube 25. The steam container 40 has a heater covering portion 45 formed around a lower end thereof. The heater covering portion 45 extends downward by a predetermined thickness to surround the steam heater 50. The steam container 40 also has a mounting recess 40a for the water level sensor 70. The mounting recess 40a is formed at an upper surface of the steam container 40 at a position close to a lateral side of the steam container 40.

As shown in FIG. 5, the steam container 40 has a partition 46 located therein. The partition 46 serves to divide the interior of the steam container 40 into a steam chamber 31 generating steam and a water level sensing chamber 32 receiving the water level sensing unit 70 installed therein. The water supply pipe 44a is connected to the water level sensing chamber 32. A water flow path 47 is defined between the steam chamber 31 and the water level sensing chamber 32, which are separated from each other by the partition 46. Thus, if water is supplied into the water level sensing chamber 32 through the water supply pipe 44a, the water is able to move into the steam chamber 31 through the flow path 47. The water level sensing chamber 32 has a shield rib 48 installed therein at a position in front of the water supply pipe 44a. The shield rib 48 serves to prevent water supplied through the water supply pipe 44a from being injected rapidly toward the water level sensing unit 70 installed in the water level sensing chamber 32.

The steam heater 50, as shown in FIG. 3, includes a heating plate 51 configured to come into close contact with the lower end of the steam container 40 so as to cover the steam chamber 31 and the water level sensing chamber 32, and a heating element 52 mounted in the heating plate 51 and connected to the terminal 53 that is coupled to a power line 54 for the supply of power. A sealing member 49 is interposed between the heating plate 51 and the steam container 40 to prevent leakage of water from the steam chamber 31 and the water level sensing chamber 32. The heating element 52 acts as a resistor adapted to generate heat whenever power is applied thereto. The heating element 52 is provided only in a portion of the heating plate 51 located below the steam chamber 31. The remaining portion of the heating plate 51 located below the water level sensing chamber 32 is perforated with a drain hole 55 to discharge water from the water level sensing chamber 32.

The drain guiding member 60 is coupled to the lower side of the steam heater 50 that is located below the water level sensing chamber 32. The drain guiding member 60 has a drain chamber 61, which is connected to the water level sensing chamber 32 through the drain hole 55 that is perforated in the heating plate 51 located below the water level sensing chamber 32 at a position close to the lateral side of the heating plate 51. The drain chamber 61 is connected to a drain pipe 62 that leads to the outside. The drain pipe 62 is connected to the drain device 90 that is coupled to the supporting bracket 80.

The drain device 90, as shown in FIG. 3, includes a drain connection tube 91 connected to the drain pipe 62, a drain valve 92 to control a water drain operation, and a drain tube 93 connected to the drain valve 92 to discharge water moved through the drain connection tube 91. The drain valve 92 is secured to a valve supporting member 93 coupled to the supporting bracket 80. With this configuration, the water in the water level sensing chamber 32 is discharged into the drain device 90 by passing through the drain hole 55, drain chamber 61, and drain pipe 62. A sealing member 63 is provided around a periphery of the drain chamber 61 between the drain guiding member 60 and the heating plate 51. The steam container 40, steam heater 50, and drain guiding member 60 are screwed to one another.

The water level sensing unit 70, as shown in FIG. 4, includes a sensing member 71 secured to a side of the steam container 40 and a pivoting member 75 hingedly coupled to the sensing member 71 in a pivotally rotatable manner.

The sensing member 71 includes a cover 72 configured to be tightly inserted into the mounting recess 40a to seal the mounting recess 40a, a magnetic sensor 73 and a magnet 73a mounted to the cover 72, and brackets 74 provided at peripheral positions of the cover 72. The cover 72 has at least one screw fastening hole 72a corresponding to a fastening hole of the steam container 40 (See "40b" of FIG. 3). Thereby, as a screw S is inserted into the fastening hole 40b through the screw fastening hole 72a, the cover 72 is fixedly mounted in the mounting recess 40a. The cover 72 is made of an elastic material, such as plastic or rubber, so that the cover 72 is tightly inserted in the mounting recess 40a without a gap, to seal the mounting recess 40a. The magnetic sensor 73 is inserted in the cover 72, to not come into contact with water. The magnetic sensor 73 is connected to the controller 85 (See FIG. 2) through a cable C and adapted to sense variation of a magnetic force generated by a magnet 78 that is provided in the pivoting member 75, to thereby transmit a sensed signal to the controller 85. A pair of the brackets 74 are extended downward from opposite peripheral positions of the cover 72 and each has a coupling hole 74a for the insertion of a hinge pin P.

The pivoting member 75 includes a hinge portion 76 hingedly coupled to the supporting brackets 74, an extension 77 coupled to an upper end of the hinge portion 76 to come into contact with the sensing member 71, the magnet 78 provided in the extension 77, and a float 79 coupled to a lower end of the hinge portion 76 to be located on the surface of water. The hinge portion 76 is inserted between the pair of brackets 74 and has a pin hole 76a corresponding to the coupling hole 74a of each bracket 76. As the hinge pin P is inserted through the coupling holes 74a and the pin hole 76a, the hinge portion 76 is hingedly coupled to the brackets 74 in a pivotally rotatable manner. The extension 77 has a disc shape to come into contact, at an upper surface thereof, with a lower surface of the cover 72. The magnet 78 is inserted in the extension 77. The float 79 has a cylindrical shape having an air chamber 79a therein. By charging air in the air chamber 79a, the float 79 is able to float on the surface of water. Moreover, the float 79 is made of a lightweight plastic material.

In the above description, it is noted that the magnetic sensor 73 provided in the sensing member 71 may be substituted by other various sensors capable of sensing positional variation of the extension 77 when the extension 77 is pivotally rotated about the hinge pin P according to variation of the level of water.

The controller 85, as shown in FIG. 2, is adapted to receive signals from the operating switches 15a and the water level sensing unit 70, so as to control operations of the convection heater 16, magnetron 17, water supply pump 23, steam heater 50, and drain valve 92.

As shown in FIG. 3, the supporting bracket 80 has a plurality of insertion holes 82 corresponding to the plurality of coupling members 42, respectively. As a plurality of coupling screws S are inserted into the respective screw holes 43 of the coupling members 42 through the insertion holes 82, the steam generator 30 is secured to the supporting bracket 80. In this case, the steam discharge pipe 41a is inserted into a through-hole 81 perforated in the supporting bracket 80, and the drain pipe 62 is inserted into the drain connection tube 91.

Hereinafter, operations of the steam generator 30 and the heating cooking apparatus 10 of the preferred embodiment of the present invention will be explained.

If a cooking operation begins, the water supply pump 23 is operated to supply water in the water vessel 21 into the water level sensing chamber 32 of the steam generator 30 through the water supply pipe 44a. The water introduced into the water level sensing chamber 32 is then supplied into the steam chamber 31 through the water flow path 47. The water supply pump 23 is adapted to stop operation thereof after the lapse of a predetermined time, to supply an appropriate amount of water into the steam container 40.

If the water is supplied into the steam chamber 31, power is applied to the heating element 52 of the steam heater 50 so that the water introduced in the steam chamber 31 is heated by the heating element 52. Thereby, steam is generated in the steam chamber 31. The generated steam is discharged from the steam chamber 31 through the steam discharge pipe 41a, to thereby be supplied into the cooking compartment 11 through the steam supply tube (not shown). In this case, if the convection heater 16 is operated, the temperature of the steam in the cooking compartment 11 is raised to a temperature sufficient to cook food disposed in the cooking compartment 11.

If the level of water in the steam chamber 31 and the water level sensing chamber 32 is maintained at a predetermined level while the steam heater 50 is operated, as shown in FIG. 5, the float 79 of the water level sensing unit 70 floats on the surface of water. Accordingly, the magnet 73a of the sensing member 71 is attached to the magnet 78 of the extension 77, to allow the extension 77 to come into close contact with the sensing member 71. In this case, the magnet 78 of the extension 77 is located close to the magnetic sensor 73 mounted in the cover 72 and thus, the magnetic sensor 73 is able to sense a magnetic force of the magnet 78.

Meanwhile, if the level of water in the steam container 40 is lowered below the predetermined level via evaporation of the water, as shown in FIG. 6, the magnet 73a of the sensing member 71 is detached from the magnet 78 of the extension 77 by the weight of the pivoting member 75. Accordingly, the pivoting member 75 is pivotally rotated about the hinge pin P, thus causing the extension 77 to be detached from the sensing member 71. In this case, the magnet 78 is moved away from the magnetic sensor 73 and the magnetic sensor 73 transmits a signal corresponding to the deteriorated magnetic force of the magnet 78 to the controller 85 (See FIG. 2). As the controller 85 operates the water supply pump 23 for a predetermined time in response to the signal from the magnetic sensor 73, consequently, the water in the steam container 40 can reach the maximum water level.

During the above-described cooking operation, the level of water in the steam container 40 is maintained at a predetermined level by operation of the water level sensing unit 70, controller 85, and water supply pump 23. This ensures an amount of water sufficient for the cooking of food to be supplied into the cooking compartment 11. After the cooking operation is completed, the supply of power to the steam heater 50 is intercepted and the drain valve 92 is opened to discharge the water in the steam chamber 31 and the water level sensing chamber 32 to the outside.

The operation of the water supply pump 23 may be controlled based on a signal from the water level sensing unit 70 rather than the predetermined time. Specifically, it is possible that the magnet 73a of the sensing member 71 is attached to the magnet 78 of the extension 77 when the level of water in the steam container 40 reaches the maximum level. In this case, the operation of the water supply pump 23 will be able to be stopped only after the extension 77 comes into contact with the sensing member 71 as the pivoting member 75 is moved upward depending on the raised level of water. This allows the water to be supplied into the steam container 40 until it reaches the maximum level.

Alternatively, the magnet 73a in the sensing member 71 may be omitted. Even in this case, the operation of the water level sensing unit 70 is the same as the above description. As is apparent from the above description, the embodiment of the present invention provides a water level sensing unit, which includes a sensing member coupled to a side of a steam container and a pivoting member configured to float on the surface of water, the pivoting member being hingedly coupled to the sensing member in a pivotally rotatable manner. As the pivoting member is adapted to be attached to or detached from the sensing member based on variation of the level of water filled in the steam container, consequently, the sensing member can sense the level of water. Accordingly, the water level sensing unit of the embodiment of the present invention has the effect of accurately sensing variation of the level of water even when a large amount of scale exists as compared to the related art when the float made of a foam polypropylene material linearly moves up and down along the center shaft based on variation of the level of water.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A water level sensing unit to sense a level of water of a container filled with water comprising:
   a sensing member having a sensor to generate a sensing signal, the sensing member being installed at a side of the container; and
   a pivoting member adapted to pivotally rotate about a side thereof having a fixed position on the basis of the level of water,
   wherein the sensor is adapted to sense positional variation of the pivoting member, to thereby sense a variation of the level of water in the container,
   wherein the pivoting member comprises:
      a hinge portion hingedly coupled to the sensing member,
      an extension extended from one end of the hinge portion, and
      a float coupled to another end of the hinge portion and adapted to float on a surface of the water, and
   wherein the hinge portion has a hinge and a pin hole and the sensing member has at least one coupling hole corresponding to the pin hole, whereby the hinge portion is hingedly coupled to the sensing member as the hinge pin is inserted through the pin hole and the coupling hole.

2. The water level sensing unit according to claim 1, wherein the float has an air chamber formed therein, the air chamber being filled with air.

3. The water level sensing unit according to claim 2, wherein the float is made of plastic.

4. The water level sensing unit according to claim 1, wherein the extension of the pivoting member has a magnet provided at an upper surface thereof, and the sensor of the sensing member is a magnetic sensor to sense a magnetic force of the magnet of the extension.

5. The water level sensing unit according to claim 4, wherein the sensing member has a magnet coupled to a lower surface thereof, and the magnetic sensor senses the variation of the level of the water filled in the container on the basis of a magnetic force that varies as the magnet of the sensing member is attached to or detached from the magnet of the extension.

6. The water level sensing unit according to claim 5, wherein the magnet of the extension is detached from the magnet of the sensing member when the float reaches a minimum level of the water in the container, whereby the minimum level of the water in the container is sensed.

7. The water level sensing unit according to claim 5, wherein the magnet of the extension is attached to the magnet of the sensing member when the float reaches a maximum level of the water in the container, whereby the maximum level of the water in the container is sensed.

8. A steam generator comprising:
   a steam container having a steam chamber to generate steam, a water supply portion to supply water into the steam chamber, and a steam discharge portion to discharge the steam generated in the steam chamber;
   a steam heater coupled to the steam chamber to heat the water in the steam chamber; and
   a water level sensing unit installed in the steam container, to sense a variation of a level of the water in the steam container,
   wherein the water level sensing unit comprises:
   a sensing member having a sensor to generate a sensing signal, the sensing member being installed at a side of the steam container, and
   a pivoting member to pivotally rotate about a side thereof and having a fixed position on the basis of the level of water, and
   wherein the sensor senses a positional variation of the pivoting member, to thereby sense the variation of the level of water in the steam container, and
   the steam container comprises a mounting recess formed at a side position thereof, and the sensing member comprises a cover configured to be inserted into the mounting recess to seal the mounting recess.

9. A steam generator comprising:
   a steam container having a steam chamber to generate steam, a water supply portion to supply water into the steam chamber, and a steam discharge portion to discharge the steam generated in the steam chamber;
   a steam heater coupled to the steam chamber to heat the water in the steam chamber; and
   a water level sensing unit installed in the steam container, to sense a variation of a level of the water in the steam container,
   wherein the water level sensing unit comprises:
   a sensing member having a sensor to generate a sensing signal, the sensing member being installed at a side of the steam container, and
   a pivoting member to pivotally rotate about a side thereof and having a fixed position on the basis of the level of water, and
   wherein the sensor senses a positional variation of the pivoting member, to thereby sense the variation of the level of water in the steam container, and
   an interior of the steam container is divided by a partition, into the steam chamber and a water level sensing chamber receiving the water level sensing unit therein, and a water flow path is defined between the steam chamber and the water level sensing chamber.

10. The steam generator according to claim 9, further comprising a drain hole provided below the water level sensing chamber, and a drain guiding member coupled underneath the drain hole, the drain guiding member having a drain pipe to discharge the water in the water level sensing chamber.

11. The steam generator according to claim 9, wherein the water supply portion is connected to the water level sensing chamber, and the water level sensing chamber has a shield rib installed therein at a position in front of the water supply portion, to prevent the water supplied through the water supply portion from being injected rapidly toward the water level sensing unit.

12. A heating cooking apparatus comprising:

a body having a cooking compartment in which food is disposed;

a steam container having a steam chamber to generate steam, a water supply device, a water supply portion connected to the water supply device to supply water into the steam chamber, and a steam discharge portion to discharge steam generated in the steam chamber into the cooking compartment;

a steam heater coupled to the steam chamber to heat the water in the steam chamber;

a water level sensing unit installed in the steam container, so as to sense a level of the water in the steam container; and a controller to control the water supply device in response to a sensing signal from the water level sensing unit, wherein the water level sensing unit comprises:

a sensing member having a sensor to generate the sensing signal, the sensing member being installed at a side of the steam container; and a pivoting member adapted to pivotally rotate about a side thereof having a fixed position on the basis of the level of water, and wherein the sensor is adapted to sense a positional variation of the pivoting member, to thereby sense a variation of the level of water in the steam container; and wherein the steam container comprises a mounting recess formed at a side position thereof, and the sensing member comprises a cover configured to be inserted into the mounting recess to seal the mounting recess.

13. The heating cooking apparatus according to claim 12, wherein the controller supplies the water into the steam container by operating the water supply device for a predetermined time if the water level sensing unit senses the minimum level of the water in the steam container.

\* \* \* \* \*